United States Patent
Li

(10) Patent No.: US 10,502,881 B2
(45) Date of Patent: Dec. 10, 2019

(54) WIRE GRID POLARIZER, METHOD OF MANUFACTURING THE SAME, AND DISPLAY DEVICE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/519,972

(22) PCT Filed: May 6, 2016

(86) PCT No.: PCT/CN2016/081228
§ 371 (c)(1),
(2) Date: Apr. 18, 2017

(87) PCT Pub. No.: WO2017/133103
PCT Pub. Date: Aug. 10, 2017

(65) Prior Publication Data
US 2018/0329126 A1 Nov. 15, 2018

(30) Foreign Application Priority Data
Feb. 2, 2016 (CN) .......................... 2016 1 0073117

(51) Int. Cl.
*G02B 5/30* (2006.01)
*G02B 5/18* (2006.01)
(Continued)

(52) U.S. Cl.
CPC ...... *G02B 5/3058* (2013.01); *B29D 11/00644* (2013.01); *G02B 5/18* (2013.01);
(Continued)

(58) Field of Classification Search
CPC ...... G02B 5/30; G02B 5/3025; G02B 5/3058; G02B 5/18; B29D 11/00644; B82Y 20/00; G02F 1/133528; G02F 2001/133548
See application file for complete search history.

(56) References Cited

U.S. PATENT DOCUMENTS 7,957,062 B2 6/2011 Takada
2005/0078374 A1 4/2005 Taira et al.
(Continued)

FOREIGN PATENT DOCUMENTS

CN 1605892 A 4/2005
CN 101622557 A 1/2010
(Continued)

OTHER PUBLICATIONS

Third Office Action for Chinese Application No. 201610073117.1, dated Jan. 22, 2018, 7 Pages.
(Continued)

*Primary Examiner* — Stephone B Allen
*Assistant Examiner* — Adam W Booher
(74) *Attorney, Agent, or Firm* — Brooks Kushman P.C.

(57) ABSTRACT

The present disclosure discloses a wire grid polarizer, a method of manufacturing the same and a display device. The method of manufacturing the wire grid polarizer includes: forming a plurality of cuboid-shaped projections that are arranged at equal intervals and parallel to each other on a surface of a substrate; performing an evaporating operation or a sputtering operation on each projection in a predetermined direction, and forming a metal layer on at least one large side surface of the projection to obtain a wire grid of the wire grid polarizer. The large side surface is the surface of the projection having the largest area, and in a plane which is perpendicular to both the large side surface and the
(Continued)

substrate. The predetermined direction is of a preset angle with respect to the height direction of the projection, and the preset angle is less than 90 degrees.

11 Claims, 4 Drawing Sheets

(51) Int. Cl.
*B29D 11/00* (2006.01)
*B82Y 20/00* (2011.01)
*G02F 1/1335* (2006.01)

(52) U.S. Cl.
CPC ............... *G02B 5/30* (2013.01); *B82Y 20/00* (2013.01); *G02F 1/133528* (2013.01)

(56) References Cited

U.S. PATENT DOCUMENTS

| | | | |
|---|---|---|---|
| 2006/0072194 A1* | 4/2006 | Lee | G02B 5/3058 359/485.05 |
| 2008/0137188 A1 | 6/2008 | Sato et al. | |
| 2010/0134719 A1 | 6/2010 | Johns et al. | |
| 2011/0080640 A1 | 4/2011 | Kaida et al. | |
| 2011/0096396 A1 | 4/2011 | Kaida et al. | |
| 2013/0040052 A1 | 2/2013 | Akita et al. | |
| 2014/0293142 A1 | 10/2014 | Kawazu et al. | |
| 2015/0241613 A1* | 8/2015 | Chan | G02B 5/1847 359/462 |

FOREIGN PATENT DOCUMENTS

| | | |
|---|---|---|
| CN | 101981479 A | 2/2011 |
| CN | 102084275 A | 6/2011 |
| CN | 202433543 U | 9/2012 |
| CN | 102834750 A | 12/2012 |
| CN | 103842862 A | 6/2014 |
| CN | 105467500 A | 4/2016 |
| JP | 2008145581 | 6/2008 |
| JP | 2008158460 | 7/2008 |

OTHER PUBLICATIONS

Second Office Action for Chinese Application No. 201610073117.1, dated Nov. 1, 2017, 7 Pages.
First Office Action for Chinese Application No. 201610073117.1, dated May 17, 2017, 6 Pages.
International Search Report and Written Opinion for Application No. PCT/CN2016/081228, dated Nov. 14, 2016, 11 Pages.

* cited by examiner

WIRE GRID POLARIZER, METHOD OF MANUFACTURING THE SAME, AND DISPLAY DEVICE

CROSS-REFERENCE TO RELATED APPLICATIONS

This application is the U.S. national phase of PCT Application No. PCT/CN2016/081228 filed on May 6, 2016, which claims priority to Chinese Patent Application No. 201610073117.1 filed on Feb. 2, 2016, the disclosures of which are incorporated in their entirety by reference herein.

TECHNICAL FIELD

The present disclosure relates to the field of display technology, in particular to a wire grid polarizer, a method of manufacturing the same and a display device.

BACKGROUND

In a wire grid polarizer made of metal layers, the metal layers in a lamination structure are arranged on the wire grid. When light is incident on the wire grid polarizer, a component of the light having an electric field vector oscillating in a direction parallel to the wire grid is almost reflected, and a component of the light having an electric field vector oscillating in a direction perpendicular to the wire grid is almost transmitted under the action of the oscillation of the free electrons in the surface of the metal layers. As is well known, compared with a conventional polarizer made of a polyvinyl alcohol (PVA) film, such wire grid polarizer may effectively improve the utilization of light. At present, the wire grid of the wire grid polarizer is usually manufactured by etching, which however results in high manufacturing costs. Furthermore, due to the accuracy constraint of the conventional etching process, the wire gird spacing of the wire grid polarizer manufactured in this way is large, so that the wire grid polarizer can only be used in a narrow visible spectrum range.

SUMMARY

The present disclosure aims to provide a technical solution that may reduce the manufacturing costs and extend the visible spectrum range where the wire grid polarizer can be applied. To this end, according to an aspect of the present disclosure, a method of manufacturing a wire grid polarizer is provided. The method includes: forming a plurality of cuboid-shaped projections that are arranged at equal intervals and parallel to each other on a surface of a substrate; performing an evaporating operation or a sputtering operation on each projection in a predetermined direction, and forming a metal layer on at least one large side surface of the projection to obtain a wire grid of the wire grid polarizer, wherein the large side surface is a surface of the projection having the largest area, and in a plane that is perpendicular to both the large side surface and the substrate, the predetermined direction is of a preset angle with respect to a height direction of the projection, and the preset angle is less than 90 degrees.

Optionally, the forming a plurality of cuboid-shaped projections that are arranged at equal intervals and parallel to each other includes: coating a resin layer on the surface of the substrate; embossing the resin layer using a nano-emboss mold and enabling the nano-emboss mold to be in contact with the substrate; and separating the nano-emboss mold from a resin material and the substrate to obtain the plurality of projections.

Optionally, the preset angle θ meets the following condition: $\tan \theta \geq d/h$, where d is a width of a gap between adjacent projections, and h is a height of each projection.

Optionally, the performing an evaporating operation or a sputtering operation on each projection in a predetermined direction, and forming a metal layer on at least one large side surface of the projection to obtain a wire grid of the wire grid polarizer includes: performing, in a first predetermined direction which is formed by rotating counterclockwise by the preset angle from the height direction of the projection, the evaporating operation or the sputtering operation on each projection so as to form the metal layer on a first large side surface and a top surface of the projection to obtain the wire grid of the wire grid polarizer.

Optionally, performing an evaporating operation or a sputtering operation on each projection in a predetermined direction, and forming a metal layer on at least one large side surface of the projection to obtain a wire grid of the wire grid polarizer includes: performing, in a second predetermined direction which is formed by rotating clockwise by the preset angle from the height direction of the projection, the evaporating operation or the sputtering operation on each projection to form the metal layer on a second large side surface and a top surface of the projection to obtain the wire grid of the wire grid polarizer.

Optionally, performing an evaporating operation or a sputtering operation on each projection in a predetermined direction, and forming a metal layer on at least one large side surface of the projection to obtain a wire grid of the wire grid polarizer includes: performing, in a first predetermined direction which is formed by rotating counterclockwise by the preset angle from the height direction of the projection, the evaporating operation or the sputtering operation on each projection to form the metal layer on a first large side surface and a top surface of the projection; and performing, in a second predetermined direction which is formed by rotating clockwise by the preset angle from the height direction of the projection, the evaporating operation or the sputtering operation on each projection to form the metal layer on a second large side surface and the top surface of the projection to obtain the wire grid of the wire grid polarizer.

Optionally, performing an evaporating operation or a sputtering operation on each projection in a predetermined direction, and forming a metal layer on at least one large side surface of the projection to obtain a wire grid of the wire grid polarizer includes: performing, in a first predetermined direction which is formed by rotating counterclockwise by the preset angle from the height direction of the projection, the evaporating operation or the sputtering operation on each projection to form the metal layers on a first large side surface and a top surface of the projection; performing, in a second predetermined direction which is formed by rotating clockwise by the preset angle from the height direction of the projection, the evaporating operation or the sputtering operation on each projection to form the metal layer on a second large side surface and the top surface of the projection; and etching completely the metal layer formed on the top surface of the projection to obtain the wire grid of the wire grid polarizer.

Optionally, a width of a gap between adjacent wire grids and a width of the projection are identical, a wire width of the wire grid=a thickness of the metal layer=(the width of the gap between adjacent projections−the width of the projection)/2, and a cycle of the wire grid=the width of the gap between the projections/2+the width of the projection/2.

Optionally, the cycle of the wire grid is greater than or equal to 80 nm and less than or equal to 150 nm.

Optionally, the cycle of the wire grid is set to be in the range of 60 nm to 100 nm.

Optionally, a material of the metal layer includes: aluminum, copper, or iron.

Optionally, the nano-emboss mold is a $SiO_2$ emboss mold.

Optionally, the method further includes: solidifying the plurality of projections.

According to another aspect of the present disclosure, a wire grid polarizer is provided, which is manufactured using the above-mentioned method.

According to yet another aspect of the present disclosure, a display device is provided, which includes the above-mentioned wire grid polarizer.

Compared with the related art, according to the wire grid polarizer, the method of manufacturing the same and the display device provided by the present disclosure, a plurality of resin projections is formed through the nano-embossing process, and the metal layers are formed on the surfaces of the resin projections through the tilted sputtering process or the tilted evaporating process, and accordingly the wire grid is obtained. The present disclosure provides improvements to the process of manufacturing the wire grid polarizer, and reduces the manufacturing costs. In addition, the present disclosure further decreases the wire grid spacing of the manufactured wire grid polarizer, and extends the visible spectrum range where the wire grid polarizer can be applied.

DETAILED DESCRIPTION

The technical solutions of the embodiments of the present disclosure will be clearly and completely described below with reference to the accompanying drawings of the embodiments of the present disclosure. Apparently, the described embodiments are only part of the embodiments of the present disclosure, but not all the embodiments. All other embodiments obtained by a person of ordinary skills in the art without any creative work based on the embodiments of the present disclosure are intended to be within the scope of the present disclosure.

Unless otherwise defined, technical or scientific terms used herein shall have the ordinary meanings as understood by a person of ordinary skills in the art to which the present disclosure pertains. The words "first," "second," and the like as used in the specification and claims of the present disclosure do not denote any order, amount or importance, but are merely used to distinguish different constituent parts. Similarly, the words "a" or "an" and the like are merely used to represent the existence of at least one member, rather than to limit the number thereof. The words "connect" or "connected" and the like are not limited to physical or mechanical connections, but may include electrical connections, whether direct or indirect. The words "on," "under," "left" and "right" and the like are merely used to indicate relative position relationships, and when an absolute position of the described object changes, the relative position relationships changes accordingly.

Figure 1:
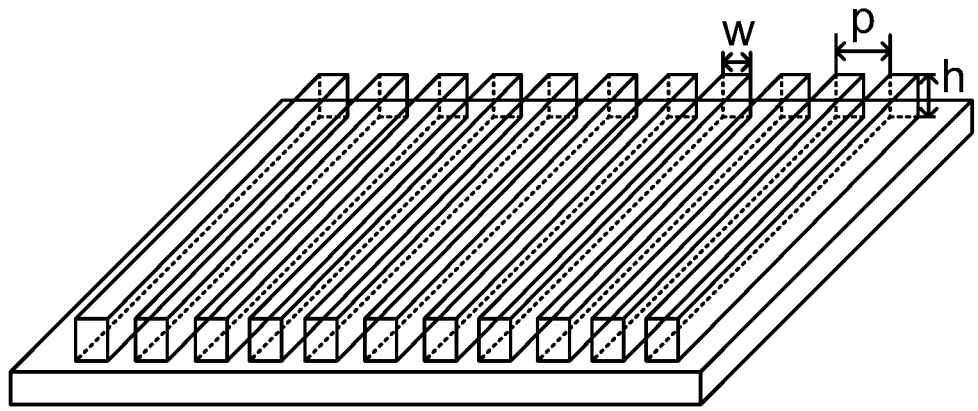
FIG. 1 is a schematic diagram of a wire grid polarizer.

Reference is made to FIG. 1 which shows a schematic diagram of a wire grid polarizer. As shown in FIG. 1, the wire grid has a cycle of p, a width of w, and a height of h.

Currently, due to the accuracy constraint of the conventional etching process, the wire grid of the wire grid polarizer manufactured by the etching process generally has a wire grid spacing at the micron level. However, the wire grid spacing at the micron level can be used for only polarizing in the infrared band. Therefore, in order to improve the length of the wire grid spacing to the nanometer level to allow the wire grid polarizer to be used in the visible wave band, scientific research personnel propose numerous optimized method of manufacturing the wire grid polarizer. For example, a double interference laser etching process and a nano-emboss etching process are proposed. However, the cost of these processes is high. Furthermore, the wire gird spacing of the wire grid polarizer manufactured in these ways is still large, so that the wire grid polarizer can be only used in a narrow visible spectrum range.

Figure 2:
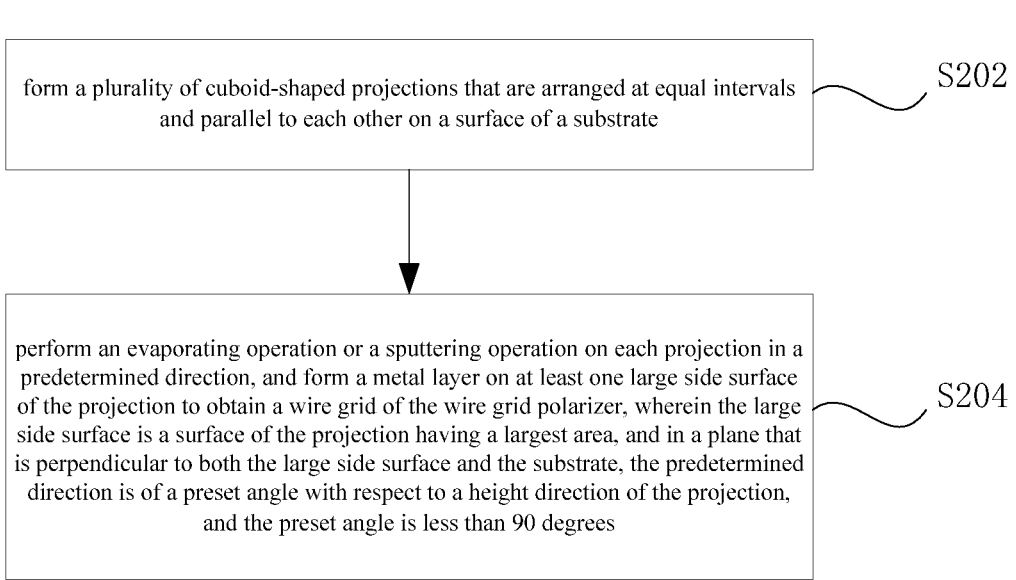
FIG. 2 is a flow chart of a method of manufacturing a wire grid polarizer according to the embodiments of the present disclosure.

The embodiments of the present disclosure provide a method of manufacturing a wire grid polarizer. FIG. 2 is a flow chart of a method of manufacturing a wire grid polarizer according to the embodiments of the present disclosure. As shown in FIG. 2, the method includes the following steps (step S202-step S204).

Step S202, forming a plurality of cuboid-shaped projections that is arranged at equal intervals and parallel to each other on a surface of a substrate.

Step S204, perform an evaporating operation or a sputtering operation on each projection in a predetermined direction, and form a metal layer on at least one large side surface of the projection to obtain a wire grid of the wire grid polarizer (WGP). The large side surface is the surface of the projection having the largest area, and in a plane which is perpendicular to the large side surface and the substrate, the predetermined direction forms a preset angle with respect to the height direction of the projection, and the preset angle is less than 90 degrees.

Through the above-mentioned two steps, it is possible to perform a tilted evaporating operation or a tilted sputtering operation on each projection formed on the substrate to form a metal layer covering part of the surface of the projection, so that a plurality of wire grids is ultimately formed on the substrate. In conventional processes of manufacturing the wire grid such as double interference laser etching technology or nano-emboss etching technology, the evaporating operation is usually performed to the whole surface of the cuboid-shaped projection to form a metal surface, and then partial metal layer between adjacent projections is etched off to form the wire grid that may transmit light. Apparently, such manufacturing process is complicated, consumes a long time and has high manufacturing costs.

As a result, compared with the conventional manufacturing process, the method of manufacturing the wire grid polarizer provided by the present disclosure simplifies the manufacturing process and significantly reduces the manufacturing costs. Furthermore, the wire grid spacing of the wire grid polarizer may be further reduced so that the wire grid polarizer can be applied in a larger visible spectrum range.

In the embodiment of the present disclosure, the above-mentioned step S202 may be implemented in such a manner: coating a resin layer on the surface of the substrate, embossing the resin layer using a nano-emboss mold, enabling the nano-emboss mold to be in contact with the substrate, and separating the nano-emboss mold from the resin material and the substrate to obtain a plurality of projections.

In practice, a variety of nano-emboss molds may be used in the nano-embossing of the coating material such as resin. As an optional example, a $SiO_2$ emboss mold may be used as the nano-emboss mold in the embodiment of the present disclosure. After the substrate is coated with the resin layer, the resin layer is embossed using the $SiO_2$ emboss mold and the $SiO_2$ emboss mold is pressed to be in contact with the substrate. In this way, no connection part is generated between adjacent projections made of resin material and each projection is separate. Finally, the $SiO_2$ emboss mold is released from the substrate.

In order to shorten the molding time of the plurality of projections to save the process time, the plurality of projections may be solidified. In practice, such solidifying process is usually used in conjunction with the nano-embossing process to improving the molding effect.

In forming metal layers on the plurality of projections, the preset angle θ should meet the following condition: $\tan \theta \geq d/h$, where d is the width of a gap between adjacent projections, h is a height of each projection. The benefit of meeting this condition lies in that during the evaporating or sputtering process, metal layers will not be formed in the areas of the substrate between two adjacent projections so that the step of etching the otherwise formed metal layers as required to transmit light through the gap between adjacent projections may be avoided and thus the cost of the process may be reduced.

Based on the above-mentioned step S202, a plurality of projections made of resin may be obtained and the wire grid of the wire grid polarizer may be formed by forming metal layers on the plurality of projections. Therefore, the implementation of forming metal layers on the projections to form the wire grid polarizer (i.e. the implementation of step S204) will be described hereinafter.

First way, the evaporating or sputtering operation on each projection is performed in a first predetermined direction which is formed by rotating counterclockwise by the preset angle from the height direction of the projection, so as to form the metal layer on a first large side surface and a top surface of the projection, thereby obtaining the wire grid of the wire grid polarizer.

When performing the evaporating or sputtering operation in the first way, the substrate may be laid flat with the surface provided with the projections facing downwards, and an evaporating apparatus or a sputtering apparatus may be used to perform the evaporating or sputtering operation towards the projection and at the preset angle to form the metal layer on the first large side surface and the top surface of the projection. Since the preset angle is obtained by counterclockwise rotating, this is equivalent to performing the evaporating or sputtering operation from the right side of the first large side surface of the projection.

In practice, during the evaporating or sputtering operation, the substrate may be tilted by the preset angle with the surface provided with the projections facing downwards, and the evaporating apparatus or the sputtering apparatus only needs to be protruded towards the projections and performs the evaporating operation in the vertical direction. Certainly, since the substrate is tilted, some projections are near to the evaporating apparatus or the sputtering apparatus and some projections are far away from the evaporating apparatus or the sputtering apparatus, and thus the metal layers obtained by evaporating or sputtering may have uneven thicknesses. As a result, the evaporating or sputtering effect is better for the mode where the substrate is laid flat.

Second way, the evaporating or sputtering operation on each projection is performed in a second predetermined direction which is formed by rotating clockwise by the preset angle from the height direction of the projection, so as to form the metal layer on a second large side surface and the top surface of the projection, thereby obtaining the wire grid of the wire grid polarizer.

When performing the evaporating or sputtering operation in the second way, the substrate may be laid flat with the surface provided with the projections facing downwards, and the evaporating apparatus or the sputtering apparatus may be used to perform the evaporating or sputtering operation towards the projection and at the preset angle to form the metal layer on the second large side surface and the top surface of the projection. Since the preset angle is obtained by clockwise rotating, this is equivalent to performing the evaporating or sputtering operation from the left side of the second large side surface of the projection.

In practice, during the evaporating or sputtering operation, the substrate may be tilted by the preset angle with the surface provided with the projections facing downwards, and the evaporating apparatus or the sputtering apparatus only needs to be protruded towards the projection and performs the evaporating operation in the vertical direction. Certainly, since the substrate is tilted, some projections are near to the evaporating apparatus or the sputtering apparatus and some projections are far away from the evaporating apparatus or the sputtering apparatus, and thus the metal layers obtained by evaporating or sputtering may have uneven thicknesses. As a result, the evaporating or sputtering effect is better for the mode where the substrate is laid flat.

Third way, the evaporating or sputtering operation on each projection is perform in the first predetermined direction which is formed by rotating counterclockwise by the preset angle from the height direction of the projection, so as to form the metal layer on the first large side surface and the top surface of the projection; and the evaporating or sputtering operation on each projection is perform in the second predetermined direction which is formed by rotating clockwise by the preset angle from the height direction of the projection so as to form the metal layer on the second large side surface and the top surface of the projection.

When performing the evaporating or sputtering operation in the third way, it takes two steps to perform the evaporating or sputtering operation. In the first step, the substrate may be laid flat with the surface provided with the projections facing downwards, and then the evaporating apparatus or the sputtering apparatus may perform the evaporating or sputtering operation towards the first large side surface and the top surface of the projection in the direction towards the projection and formed by rotating counterclockwise by the preset angle to form the metal layers. In the second step, the evaporating apparatus or the sputtering apparatus performs the evaporating or sputtering operation to the second large side surface and the top surface of the projection in the direction towards the projection and formed by rotating clockwise by the preset angle. That is, the evaporating or sputtering operation is performed from the right side of the first large side surface towards the first large side surface and the top surface first, and then the evaporating or sputtering operation is performed from the left side of the second large side surface towards the second large side surface and the top surface to form the metal layer on the first large side surface, the second large side surface and the top surface finally.

Fourth way, the evaporating or sputtering operation on each projection is performed in the first predetermined direction which is formed by rotating counterclockwise by the preset angle from the height direction of the projection, so as to form the metal layer on the first large side surface and the top surface of the projection; and the evaporating or sputtering operation on each projection is performed in the second predetermined direction which is formed by rotating clockwise by the preset angle from the height direction of the projection, so as to form the metal layer on the second large side surface and the top surface of the projection. And then the metal layer formed on the top surface of the projection is etched completely to obtain the wire grid of the wire grid polarizer.

It should be understood that the fourth way is optimized on the basis of the third way to further increase the light transmittance of the wire grid polarizer. In the fourth way, the metal layer on the top surface of the projection is completely etched. Certainly, in practice, part of the metal layer formed on the top surface may be etched.

That is, since the metal layer on the top surface of each projection is completely etched, the metal layers remaining on the side surfaces of each projection form two separate wire grid. In this way, light may pass through the gap between two wire grids (i. e. the air), and also may pass through the projections between the two wire grids (since the projections are made of resin which is transparent).

As an optional example, in the embodiments of the present disclosure, the width of a gap between the formed adjacent wire grids and a width of the projections are the same, a wire width of the wire grid=a thickness of the metal layer=(the width of the gap between the projections−the width of the projection)/2, and a cycle of the wire grid=the width of the gap between the projections/2+the width of the projection/2.

In the embodiments of the present disclosure, the material of the metal layers may include: aluminum, copper, or iron. As an optional example, the material of the metal layers may be aluminum.

As an optional example, the cycle of the finally formed wire grid in the embodiments of the present disclosure may be greater than or equal to 80 nm and less than or equal to 150 nm. The wire grid spacing obtained in this way may be further reduced so that the wire grid polarizer can be applied in a larger visible spectrum range.

In order to facilitate understanding of the implementations of the above-mentioned four ways for the step S202 in conjunction with the step S204, further description will be given in combination with three examples.

In an embodiment, the implementations of the first and the second ways for the step S202 in conjunction with S204 is described, and the above-mentioned ways will be implemented by the following steps.

Figure 3:
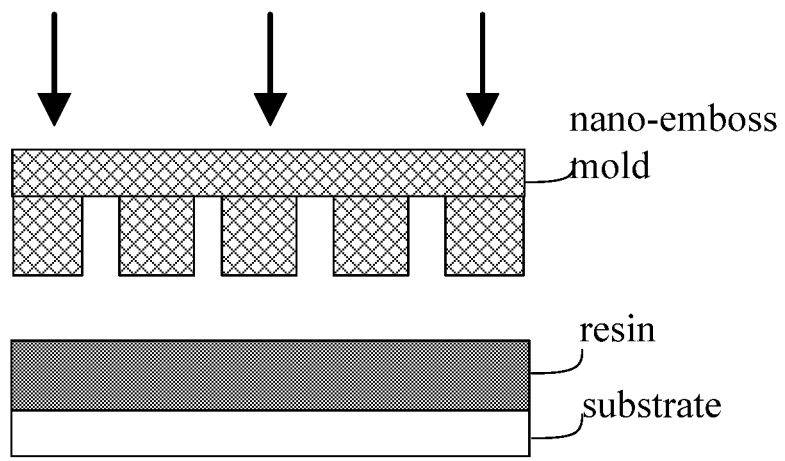
FIG. 3 is a schematic diagram of a nano-embossing process according to the embodiments of the present disclosure.
Figure 4:
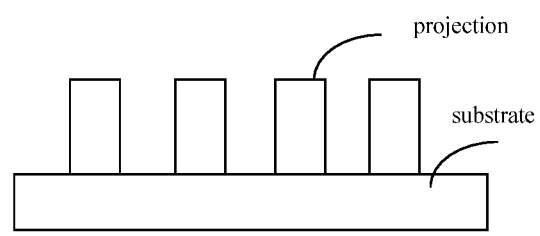
FIG. 4 is a cross-sectional view of a projection formed by a nano-embossing process according to the embodiments of the present disclosure.

(1) As shown in FIG. 3 which is a schematic diagram of a nano-embossing process of the embodiments of the present disclosure, the resin of a certain thickness is coated on the substrate, and a nano-embossing operation using a nano-emboss mold (e.g. a $SiO_2$ emboss mold) is performed and a solidifying operation is performed to form the nano-emboss pattern as shown in FIG. 4 which is a cross-sectional view of projections formed by the nano-embossing process according to the embodiments of the present disclosure.

(2) An evaporating or sputtering operation is performed at a certain angle θ (i.e. the preset angle) to the nano-emboss pattern as shown in FIG. 4, with Al as the metal material used in the evaporating or sputtering operation.

(3) A single-side evaporating or sputtering operation is performed on each projection of the nano-emboss pattern.

In this way, the method as shown by the first way may be realized, and the method as shown by the second way may be realized similarly.

Figure 5A:
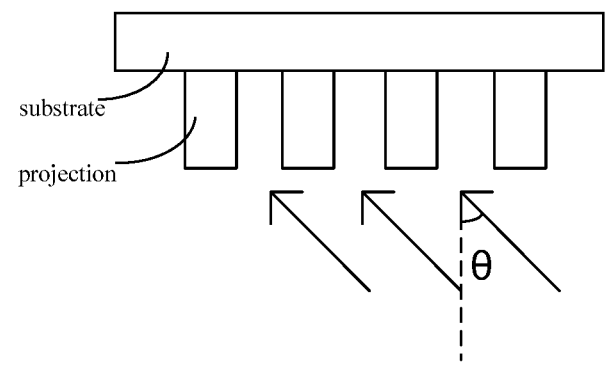
FIG. 5A is a schematic diagram showing evaporating or sputtering on the right side of projections according to the embodiments of the present disclosure.
Figure 5B:
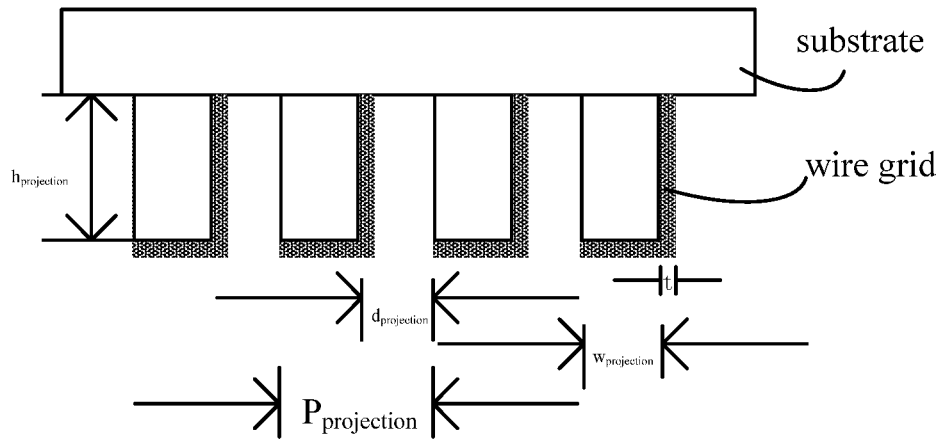
FIG. 5B is a schematic diagram showing metal layers formed according to FIG. 5A.

For ease of understanding, reference is made to FIGS. 5A and 5B. FIG. 5A is a schematic diagram showing evaporating or sputtering on the right side of projection according to the embodiments of the present disclosure, and FIG. 5B is a schematic diagram showing metal layers formed according to FIG. 5A. That is, FIGS. 5A and 5B show the implementation of the first way (where the evaporating or sputtering operation is performed from the right side of the projection), where the metal layers are finally formed on the right side surface (i.e. the first large side surface) and the top surface of the projection. Similarly, the second way may be implemented by performing the evaporating or sputtering operation from the left side of the projection, where the metal layers are finally formed on the left side surface (i.e. the second large side surface) and the top surface of the projection. By adopting such single-side evaporating or sputtering ways, one Mask process may be reduced, thereby simplifying the manufacturing process of the wire grid polarizer and reducing the manufacturing costs.

In this embodiment, providing that the height of the projection obtained by the nano-embossing operation is $h_{projection}$, the cycle of the projections is $P_{projection}$, the width of the gap between the projections is $d_{projection}$, the width of the projection is $w_{projection}$, the thickness of the metal layer is t, the tilt angle for the evaporating or sputtering operation is θ, then the following condition should be met: $\tan θ \geq d_{projection}/h_{projection}$. As a result, as shown in FIG. 5, the cycle of the wire grid of the finally formed wire grid polarizer is $P_{grid}=w_{projection}+d_{projection}$, the wire width of the wire grid is $w_{projection}+t$, and the width of the gap of the wire grid is $d_{projection}-t$. In this way, in the event that the cycle of the grating remain the same, the wire width of the grating is increased, the gap of the grading is decreased so that the visible range in which the wire grid polarizer may be applied may be extended. In practice, the wire grid cycle $P_{grid}$ of the finally formed wire grid may be set to be in the range of 60 nm to 100 nm.

In another embodiment, a dual-side evaporating or sputtering operation is performed based on the above-mentioned embodiment. This embodiment will describe the implementation of the third way for the step S202 in conjunction with step S204. This example is realized by the following steps:

(1) As shown in FIG. 3 which is a schematic diagram of a nano-embossing process of the embodiments of the present disclosure, the resin of a certain thickness is coated on the substrate, a nano-embossing operation using a nano-emboss mold (e.g. a SiO$_2$ emboss mold) is performed and a solidifying operation is performed to form the nano-emboss pattern as shown in FIG. 4 which is a cross-sectional view of projections formed by a nano-embossing operation according to the embodiments of the present disclosure.

(2) An evaporating or sputtering operation is performed at a certain angle θ (i.e. the preset angle) to the nano-emboss pattern as shown in FIG. 4, with Al as the metal material used in the evaporating or sputtering operation.

Figure 6A:
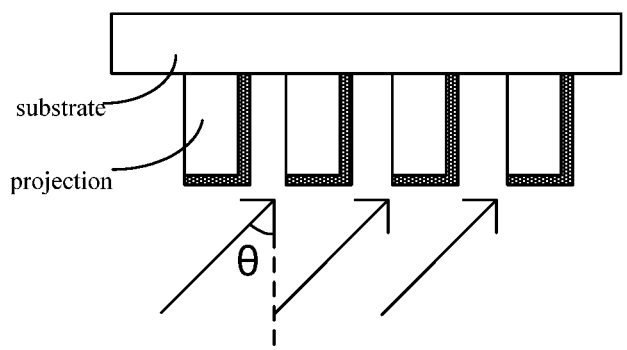
FIG. 6A is a schematic diagram showing evaporating or sputtering on the left side of projections on the basis of FIG. 5A.
Figure 6B:
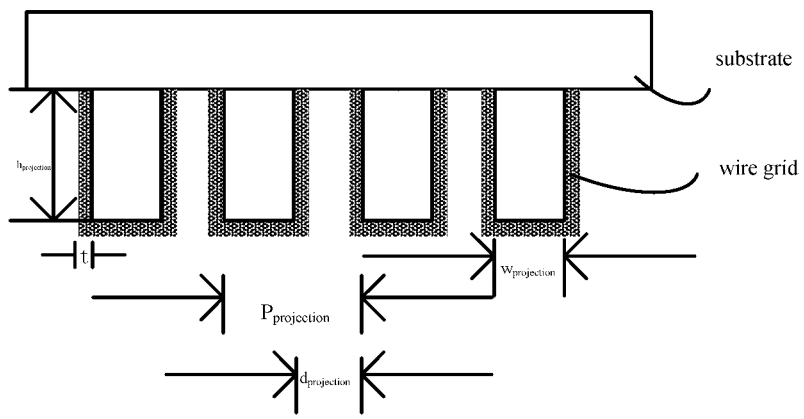
FIG. 6B is a schematic diagram showing metal layers formed according to FIG. 6A.

(3) A dual-side evaporating or sputtering operation is performed on each projection of the nano-emboss pattern (corresponding to the third way). For ease of understanding, reference is made to FIGS. 6A and 6B. FIG. 6A is a schematic diagram showing evaporating or sputtering on the left side of projection on the basis of FIG. 5A, and FIG. 6B is a schematic diagram showing the metal layers formed according to FIG. 6A. That is, first, the evaporating or sputtering operation is performed from the right side of the projection at a certain angle θ to the right side surface and the top surface of the projection to apply the metal material (e.g. Al) on the right side surface (i.e. the above-mentioned first large side surface) and the top surface of the projection, and then the evaporating or sputtering operation is performed at the same angle θ on the left side to apply the metal material (e.g. Al) on the left side surface (i.e. the above-mentioned second large side surface) and the top surface of the projection. By adopting such dual-side evaporating or sputtering ways, the metal layers on the top surface does not need any etching process and thus one Mask process may be reduced, thereby simplifying the manufacturing process of the wire grid polarizer and reducing the manufacturing costs.

In this embodiment, the cycle of the wire grid of the wire grid polarizer is $P_{grid} = w_{projection} + d_{projection}$, the wire width of the wire grid is ($w_{projection} + 2t$), and the gap of the grid is ($d_{projection} - 2t$). In practice, the wire grid cycle $P_{grid}$ of the finally formed wire grid may be set to be in the range of 60 nm to 100 nm.

In yet another embodiment which is based on the above-mentioned embodiment, the metal layers on the top surfaces of the projections are etched to obtain the wire grid polarizer. After all the steps of the above-mentioned embodiment are performed, the following steps are performed.

Figure 7A:
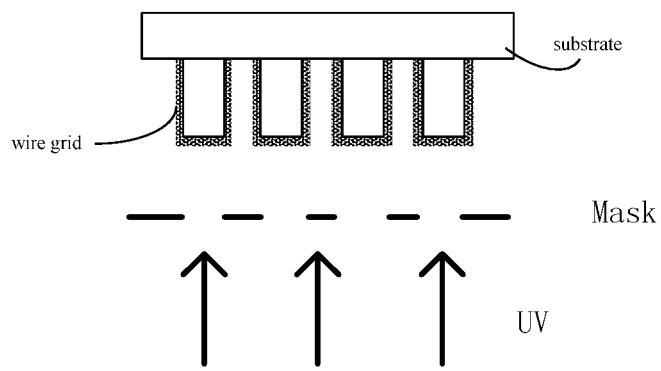
FIG. 7A is a schematic diagram of etching top metal layers formed by evaporating or sputtering on both sides of projections according to the embodiments of the present disclosure.
Figure 7B:
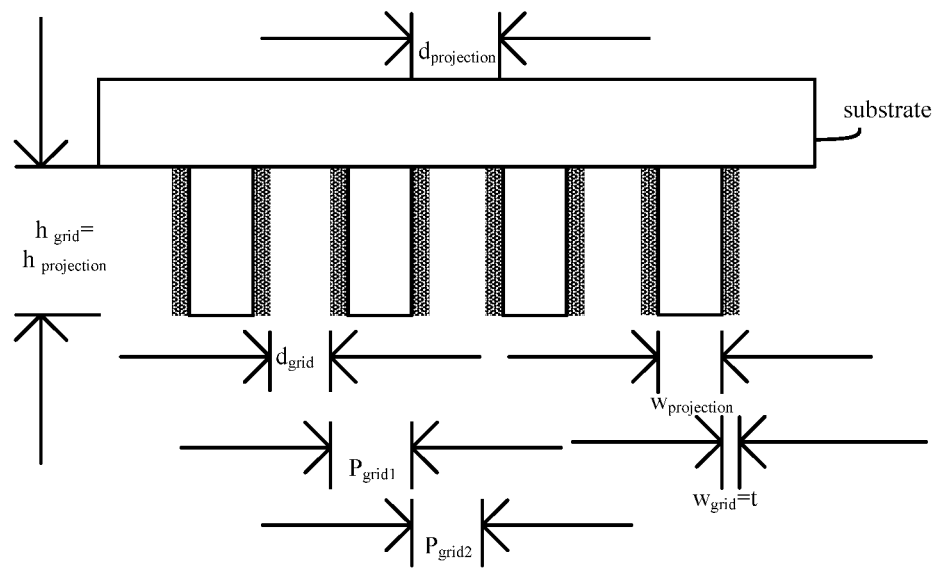
FIG. 7B is a schematic diagram showing metal layers formed according to FIG. 7A.

As shown in FIG. 7A, which is a schematic diagram of etching metal layers on the top surface formed by evaporating or sputtering on both sides of the projection according to the embodiments of the present disclosure, the formed pattern is exposed and etched to remove the metal part on the top surface and reserve the metal on the side surfaces, thereby forming the wire grid pattern as shown in FIG. 7B which is a schematic diagram showing the metal layers formed according to FIG. 7A. Certainly, part of the metal layers on the top surface may be etched, or the whole metal layers on the top surface may be etched.

It should be noted that if the whole metal layer is chosen to be etched, over-etching may be properly performed to ensure the etching effect, and accordingly, the height of the metal layers on the side surfaces (i.e. the two large side surfaces) is slightly reduced. This embodiment may achieve smaller grating cycle and narrower wire grid width. In the present embodiment, the substrate should meet the following conditions: $P_{grid\ 1} = P_{grid\ 2}$, $P_{grid\ 1} = w_{projection} + t$, $P_{grid\ 2} = d_{projection} - t$, the cycle of the mother grating after the nano-embossing operation (i.e. the projections) $P_{projection} = w_{projection} + d_{projection}$. Based on these parameter relations, the following may be obtained: $t = (d_{projection} - w_{projection})/2$, $P_{grid\ 1} = P_{grid\ 2} = (d_{projection} + w_{projection})/2 = P_{projection}/2$. For example, before the metal layers are formed, the cycle of the projections $P_{projection}$ is 200 nm, the width of the projection $w_{projection}$ is 80 nm, the width of the gap between projections is 120 nm, the thickness of required metal obtained by aslant evaporating or sputtering $t = (d_{projection} - w_{projection})/2 = 20$ nm, the cycle $P_{grid\ 1} = P_{grid\ 2} = P_{projection}/2 = 100$ nm. The angle for performing the evaporating or sputtering operation Θ should meet: tan $θ \geq d_{projection}/h_{projection}$. That is, by adopting this embodiment, under the same manufacturing condition, the cycle of the wire grid may be reduced by half, and the width of the wire grid may also be significantly reduced.

With respect to the above-mentioned method of manufacturing the wire grid polarizer, the embodiments of the present disclosure provides a wire grid polarizer the improvement of which is that the wire grid polarizer is manufactured using the above-mentioned method of manufacturing the wire grid polarizer, which will not be repeated in conjunction with the drawings herein.

Further, based on the wire grid polarizer which is manufactured using the improved manufacturing process, the embodiments of the present disclosure provides a display device, the improvement of which is that the display device includes the above-mentioned improved wire grid polarizer, which will not be repeated in conjunction with the drawings herein.

In view of the above, compared with the conventional process, in the embodiments of the present disclosure, the process of manufacturing the wire grid polarizer is optimized by combining the nano-embossing operation and the tilted evaporating or sputtering operation. Therefore, the cycle of the wire grid and the wire grid spacing of the wire grid polarizer are further reduced compared with the related art, thereby reducing the cost of the manufacturing process and improving the polarization degree of the wire grid in the visible range.

The above-mentioned embodiments are merely optional embodiments of the present disclosure. It should be noted that improvements and modifications may be made by those skilled in the art without departing from the technical principles of the present disclosure. These improvements and modifications should also be considered within the scope of protection of the present disclosure.

What is claimed is:
1. A method of manufacturing a wire grid polarizer, comprising:
   forming a plurality of cuboid-shaped projections that are arranged at equal intervals and parallel to each other on a surface of a substrate;
   performing, in a first predetermined direction, which is formed by rotating counterclockwise by a preset angle from a height direction of a projection, an evaporating operation or a sputtering operation on each projection to form a metal layer on a first side surface and a top surface of the projection;
   performing, in a second predetermined direction, which is formed by rotating clockwise by the preset angle from the height direction of the projection, the evaporating operation or the sputtering operation on each projection to form the metal layer on a second side surface and the top surface of the projection; and
   etching completely the metal layer formed on the top surface of the projection by a mask to obtain a wire grid of the wire grid polarizer, wherein the first predetermined direction and a second determination direction is each of a preset angle θ with respect to a height direction of the projection, and the preset angle θ is less than 90 degrees.

2. The method according to claim 1, wherein the forming a plurality of cuboid-shaped projections that are arranged at equal intervals and parallel to each other comprises:
coating a resin layer on the surface of the substrate;
embossing the resin layer using a nano-emboss mold and enabling the nano-emboss mold to be in contact with the substrate; and
separating the nano-emboss mold from the resin layer and the substrate to obtain the plurality of projections.

3. The method according to claim 2, wherein the preset angle θ meets the following condition:
tan θ≥d/h, where d is a width of a gap between adjacent projections, and h is a height of each projection.

4. The method according to claim 2, wherein the nano-emboss mold is a $SiO_2$ emboss mold.

5. The method according to claim 2, further comprising:
solidifying the plurality of projections.

6. The method according to claim 1, wherein a width of a gap between adjacent wire grids and a width of the projection are identical, a wire width of the wire grid=a thickness of the metal layer=(the width of the gap between adjacent projections—the width of the projection)/2, and a cycle of the wire grid=the width of the gap between the projections/2+the width of the projection/2.

7. The method according to claim 6, wherein the cycle of the wire grid is greater than or equal to 80 nm and less than or equal to 150 nm.

8. The method according to claim 7, wherein the cycle of the wire grid is set to be in a range of 80 nm to 100 nm.

9. The method according to claim 1, wherein a material of the metal layer comprises: aluminum, copper, or iron.

10. A wire grid polarizer manufactured using the method according to claim 1.

11. A display device, comprising the wire grid polarizer according to claim 10.

* * * * *